(12) United States Patent
Takahashi et al.

(10) Patent No.: US 6,227,686 B1
(45) Date of Patent: May 8, 2001

(54) LIGHT SOURCE APPARATUS

(75) Inventors: Motoo Takahashi; Mitsuhiro Kawaguchi, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/455,789

(22) Filed: Dec. 7, 1999

(30) Foreign Application Priority Data

Apr. 2, 1999 (JP) .................................................. 11-096025

(51) Int. Cl.[7] ........................................................ F21V 29/00
(52) U.S. Cl. ............................. 362/345; 362/294; 362/373
(58) Field of Search ............................... 362/96, 276, 294, 362/373, 345, 311, 218

(56) References Cited

U.S. PATENT DOCUMENTS 4,630,182 * 12/1986 Moroi et al. .......................... 362/345
4,858,089 * 8/1989 Pietro ................................... 362/294
5,207,505 * 5/1993 Naraki et al. ........................ 362/373
5,622,418   4/1997 Daijogo et al. .

FOREIGN PATENT DOCUMENTS 8114857     5/1996  (JP) .
B2-2860989 12/1998  (JP) .

* cited by examiner

*Primary Examiner*—Y. Quach

(57) ABSTRACT

A light source apparatus has a luminescent tube, a reflecting mirror, a securing member and bonding material as a holding member disposed to block a part of a small opening of the reflecting mirror and holding the luminescent tube in the reflecting mirror, a transparent protection plate for blocking the large opening of the reflecting mirror, a ventilator for sucking air inside the reflecting mirror through the small opening and sending out the air through an outlet, and a housing for combining the reflecting mirror and the ventilator; and the reflecting mirror includes an air inlet disposed closer to the large opening than a center position of the luminescent tube.

7 Claims, 3 Drawing Sheets

LIGHT SOURCE APPARATUS

The present invention relates to a high-brightness light source apparatus incorporated in an image projection system such as a liquid crystal projector.

This type of a prior art light source apparatus is disclosed in, for example, Japanese Patent Kokai Publication No. 8-114857 published on May 7, 1996. The light source apparatus uses a high-pressure discharge lamp such as a small short-arc metal-halide lamp, which features large output, high light emission efficiency, long life, and superior color rendering, as the luminescent tube. When the luminescent tube is lit, the temperature of the luminescent tube increases as high as 400° C. to 700° C. This may cause some problems such as decreased transparency or devitrification, of the silica glass forming the luminescent tube, disconnection of the metal electrode of the luminescent tube because of oxidation, deformation or fracture of the silica glass, or cracks in the reflecting mirror. In order to prevent these problems from occurring, the prior art light source apparatus is provided with a ventilator for forcing out the air inside the reflecting mirror.

In the prior art light source apparatus, however, the luminescent tube frequently ruptures, which can result from insufficient or uneven cooling of the luminescent tube. This can cause the broken pieces of the glass forming the luminescent tube to scatter. Extreme care must be taken especially when replacing the luminescent tube.

If the luminescent tube is excessively cooled, sufficiently high level of brightness cannot be obtained, the emission color is degraded, and the sealed-in metal in the luminescent tube is spattered to cause blackening, reducing the transparency of the tube wall.

SUMMARY OF THE INVENTION

An object of the present invention is to provide a light source apparatus that can reduce a risk of rupture of the luminescent tube and degradation of light emitting property and can be safely replaced even if the luminescent tube is ruptured.

According to the present invention, a light source apparatus comprises: a luminescent tube; a reflecting mirror including a large opening for light emission, a small opening used for holding the luminescent tube, and a light reflection surface disposed to encircle the luminescent tube; a holding member disposed to block a part of the small opening, the holding member holding the luminescent tube in the reflecting mirror; a light transmitting protection plate for blocking the large opening; a ventilator for sucking air inside the reflecting mirror through the small opening and sending out the air through an outlet; and a housing for combining the reflecting mirror and the ventilator so as to form a channel for directing the air sucked through the small opening toward the ventilator; the reflecting mirror including an air inlet disposed closer to the large opening than a center position of the luminescent tube.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

Figure 1:
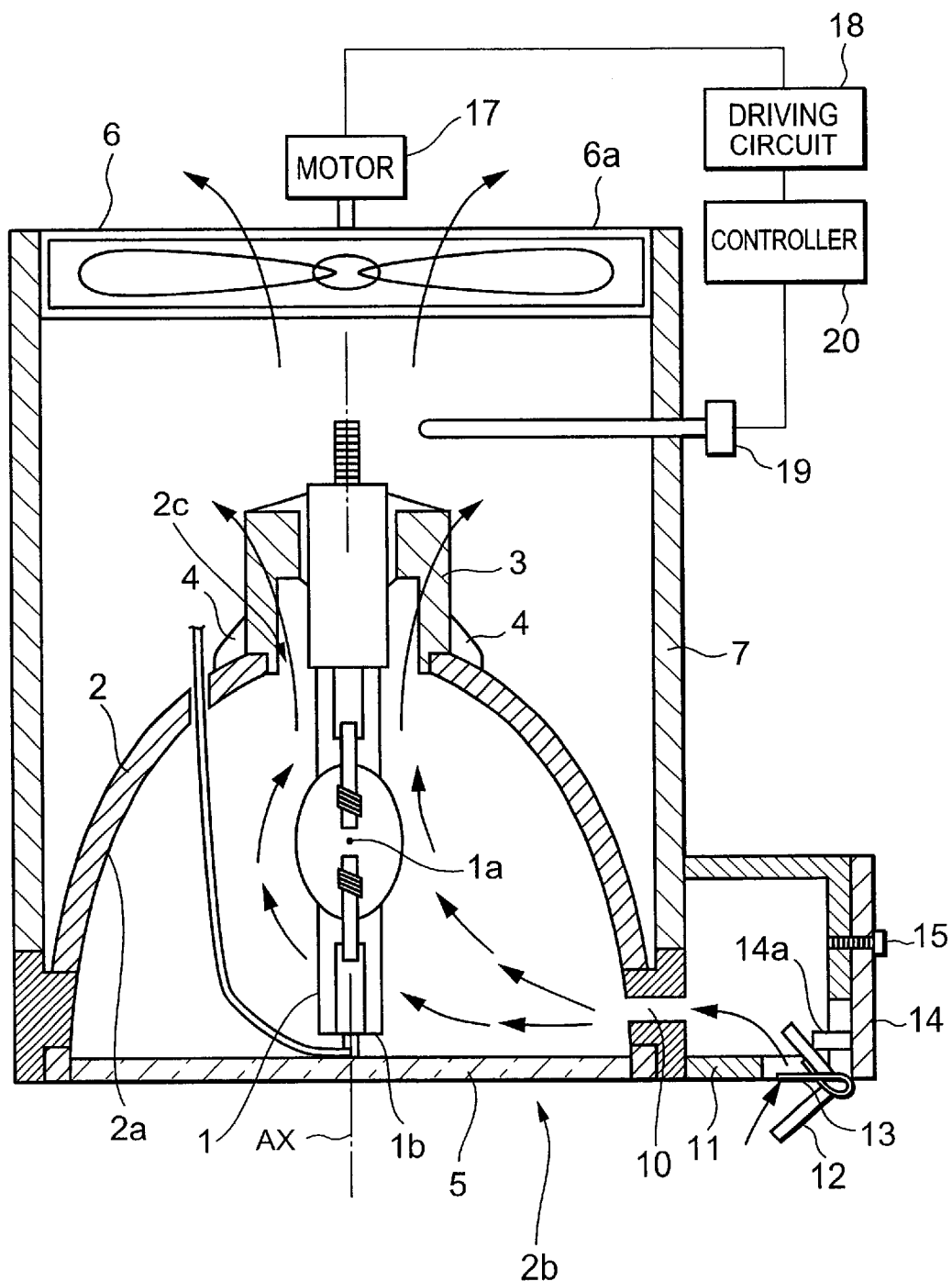
FIG. 1 shows a schematic sectional view of the configuration of a light source apparatus according to an embodiment of the present invention.

FIG.1 shows a schematic sectional view of the configuration of the light source apparatus according to an embodiment of the present invention.

As shown in FIG. 1, the light source apparatus of this embodiment has a luminescent tube 1 such as a metal halide lamp filled with metal halide and a reflecting mirror 2 provided with a light reflection surface 2a formed by a quadric surface of revolution such as sphere, paraboloid, or ellipsoid. The reflecting mirror 2 has a large opening 2b for light emission and a small opening 2c formed for holding the luminescent tube 1. The reflecting mirror 2 is disposed in such a manner that the light reflection surface 2a encircles the luminescent tube 1 and that an optical axis AX of the reflecting mirror 2 matches an optical axis of the luminescent tube 1. The reflecting mirror 2 is formed by vapor deposition, in which a multi-layer dielectric film is formed onto a surface of a glass base, for instance.

The light source apparatus of this embodiment also has a securing member 3, which is disposed to block a part of the small opening 2c of the reflecting mirror 2 and to secure the luminescent tube 1 onto the reflecting mirror 2, and a bonding material 4 for bonding the securing member 3 to the reflecting mirror 2. The securing member 3 is made of crystallized glass, for instance. The bonding material 4 is a heat-resistant inorganic adhesive agent, for instance. It is desired that a gap of the small opening 2c which is left unblocked by the luminescent tube 1, the securing member 3, and the bonding material 4 be symmetric with respect to the optical axis AX of the reflecting mirror 2 because the flow of air can be symmetric with respect to the axis. Viewed along the optical axis AX, for instance, it is preferable that a pair of C-shaped gaps facing each other be formed.

Further, the light source apparatus of this embodiment has a transparent protection glass 5 for blocking the large opening 2b of the reflecting mirror 2, an axial fan 6 for sucking air inside the reflecting mirror 2 through the small opening 2c and discharging the air through an outlet 6a, and a housing 7 that combines the reflecting mirror 2 and the axial fan 6 to form a path for guiding the air sucked through the small opening 2c to the axial fan 6. In case of rupture of the luminescent tube 1, the protection glass 5 prevents the broken pieces from scattering out.

Moreover, in the light source apparatus of this embodiment, the reflecting mirror 2 has an air inlet 10, which is formed on a side of the large opening 2b from a center position 1a of the luminescenttube 1. It is desired that the air inlet 10 be formed near the large opening 2b, preferably in a position almost aligned with an end 1b of the luminescent tube 1 on the large opening side or in a position closer to the large opening 2b. The housing 7 has an integral structure sealed to both the reflecting mirror 2 and the axial fan 6 so that air flows into the reflecting mirror 2 only through the air inlet 10 and flows out only through the outlet 6a of the axial fan 6. It is preferable that the opening area of the air inlet 10 be smaller than the area of the gap of the small opening 2c left unblocked by the luminescent tube 1, the securing member 3, and the bonding material 4. The opening area of the air inlet 10 should be limited to some extent because the air flow can come in through the air inlet 10 at a high velocity and the incoming air can be immediately directed to the luminescent tube 1, as illustrated by arrows in FIG. 1. That is, the luminescent tube 1 can be efficiently and evenly cooled. After the luminescent tube 1 is lit, the heat generated by the luminescent tube 1 causes the temperature of the air inside the reflecting mirror 2 to rise. This increase in temperature encourages expansion of the air, which increases the pressure inside the reflecting mirror 2, helping air go out of the small opening 2c.

Figure 2:
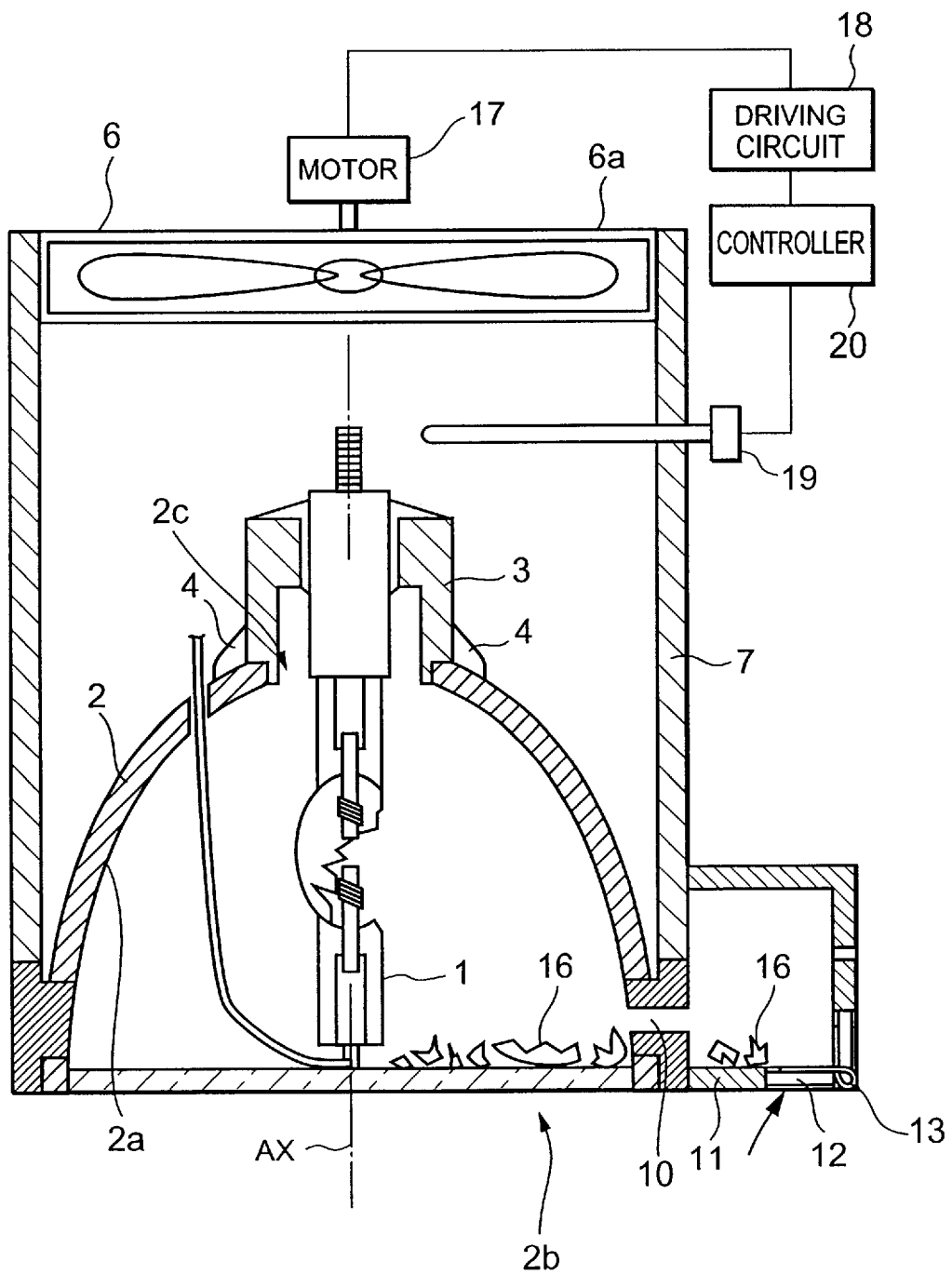
FIG. 2 shows a schematic sectional view of the light source apparatus shown in FIG. 1 with a door closed after rupture of a luminescent tube and FIG. 3 shows a schematic sectional view of the configuration of a light source apparatus wherein an air inlet 10 is disposed closer to the large opening 2b than an end of the luminescent tube 1b according to an embodiment of the present invention.
Figure 3:
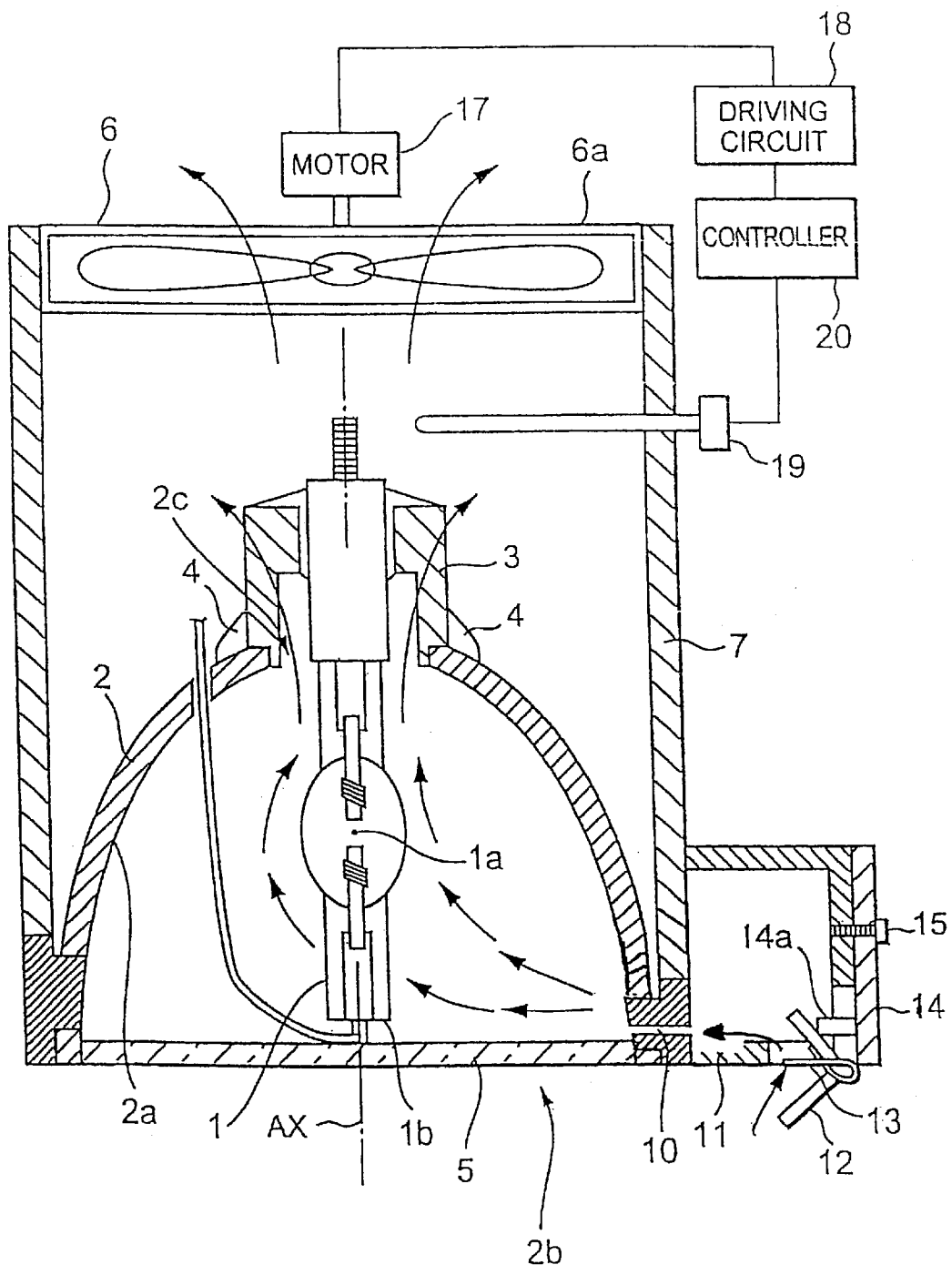

The light source apparatus of this embodiment also has a duct 11 for forming a passage which connects the air inlet 10 of the reflecting mirror 2 and the outside of the apparatus, a door 12 for opening and closing the passage, and a return spring 13 for returning the door 12 to its closed position while the door is free from external forces, as shown in FIG. 2. In the light source apparatus of this embodiment, the stopping member 14 is fastened to the duct 11 by a screw 15, as shown in FIG. 1, so that the projection 14a of the stopping member 14 holds the door 12 open, coming into contact with the door 12. If the stopping member 14 is removed, the door 12 is closed by the action of the return spring 13, as shown in FIG. 2. In case of rupture of the luminescent tube 1, the stopping member 14 is removed to keep the door 12 closed, then the light source apparatus is replaced. Even if the broken pieces 16 of the luminescent tube 1 burst out through the air inlet 10, as shown in FIG. 2, the light source apparatus can be replaced after the door 12 is closed, reducing risk of harm to the worker.

Further, the light source apparatus of this embodiment has a motor 17 for driving the axial fan 6, a driving circuit 18 for driving the motor 17, a temperature sensor 19 disposed downstream from the luminescent tube 1 in a direction of air flow made by the axial fan 6, and a controller 20 for controlling air discharging capability of the axial fan 6 according to an output of the temperature sensor 19. The temperature sensor 19 is not necessarily disposed downstream from the luminescent tube 1 in a direction of the air flow and can be disposed in any other position where the temperature of the air can be sensed. More specifically, the discharging capability of the axial fan 6 is increased if the temperature sensed by the temperature sensor 19 increases, and the discharging capability of the axial fan 6 is decreased if the sensed temperature decreases. By controlling the discharging capability of the axial fan 6 in that way, the temperature of the luminescent tube 1 can be held at an appropriate level.

The shapes of the luminescent tube 1, the reflecting mirror 2, the housing 7, the door 12, the stopping member 14, and the like are not limited to those shown in the figures.

A plurality of air inlets 10 may be disposed symmetrically with respect to the axis AX, for instance.

As has been described above, because of the protection plate 5 and the air inlet 10 of the reflecting mirror, a current of air entering through the air inlet 10 can be forced along the luminescent tube 1 toward the rear of the reflecting mirror 2, evenly cooling the luminescent tube 1 and the reflecting mirror 2.

Further, the housing 7 is structured to let air flow into the reflecting mirror 2 only through the air inlet 10 and flow out only through the outlet 6a of the fan 6, so that the luminescent tube 1 can be efficiently cooled.

Furthermore, if the air inlet 10 is disposed closer to the large opening than the end 1b of the luminescent tube 1 on the large opening side, the whole luminescent tube 1 can be evenly cooled.

Moreover, since the opening area of the air inlet 10 is smaller than the area of the gap of the small opening 2c that is left unblocked by the luminescent tube 1 and the other members, the velocity of air entering from the air inlet 10 can be increased. Accordingly, the incoming air can be immediately directed onto the luminescent tube 1, so that the luminescent tube 1 can be efficiently and evenly cooled.

In addition, the shape of the gap of the small opening 2c left unblocked by the luminescent tube 1 and the other members is symmetric with respect to the optical axis AX of the reflecting mirror 2, so that the luminescent tube 1 can be evenly cooled.

Further, since the duct 11 for forming the passage connecting the air inlet 10 and the outside of the apparatus, the door 12, and the return spring 13 are provided, the light source apparatus can be replaced with the door 12 closed, in case of rupture of the luminescent tube 1, enabling a safe replacement of the light source apparatus.

Furthermore, the air discharging capability of the fan 6 is controlled based on the output of the temperature sensor 19, so that the temperature of the luminescent tube 1 can be maintained at an appropriate level.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A light source apparatus comprising:
   a luminescent tube;
   a reflecting mirror including a large opening for light emission, a small opening used for holding said luminescent tube, and a light reflection surface disposed to encircle said luminescent tube;
   a holding member disposed to block a part of said small opening, said holding member holding said luminescent tube in said reflecting mirror;
   a light transmitting protection plate for blocking said large opening;
   a ventilator for sucking air inside said reflecting mirror through said small opening and sending out the air through an outlet of the ventilator; and
   a housing for combining said reflecting mirror and said ventilator so as to form a channel for directing the air sucked through said small opening toward said ventilator;
   said reflecting mirror including an air inlet disposed closer to said large opening than a center position of said luminescent tube;
   wherein an opening area of said air inlet is smaller than an area of a gap of said small opening which is left unblocked by said luminescent tube and said holding member.

2. The light source apparatus according to claim 1, further comprising:
- a temperature sensor for detecting an internal temperature of the housing; and
- a controller for controlling air discharging capability of said ventilator according to the internal temperature detected by the temperature sensor so as to hold a temperature of the luminescent tube at an appropriate level.

3. A light source apparatus comprising:
- a luminescent tube;
- a reflecting mirror including a large opening for light emission, a small opening used for holding said luminescent tube, and a light reflection surface disposed to encircle said luminescent tube;
- a holding member disposed to block a part of said small opening, said holding member holding said luminescent tube in said reflecting mirror;
- a light transmitting protection plate for blocking said large opening;
- a ventilator for sucking air inside said reflecting mirror through said small opening and sending out the air through an outlet of the ventilator; and
- a housing for combining said reflecting mirror and said ventilator so as to form a channel for directing the air sucked through said small opening toward said ventilator;
- said reflecting mirror including an air inlet disposed closer to said large opening than a center position of said luminescent tube;
- wherein said housing has a structure sealed to both said reflecting mirror and said ventilator so that air comes inside said reflecting mirror only through said air inlet and goes out only through the outlet of said ventilator.

4. The light source apparatus according to claim 3, wherein said air inlet is disposed closer to said large opening than an end of said luminescent tube on a side of said large opening.

5. The light source apparatus according to claim 3, wherein a shape of a gap of said small opening which is left unblocked by said luminescent tube and said holding member is symmetric with respect to an optical axis of said reflecting mirror.

6. A light source apparatus comprising:
- a luminescent tube;
- a reflecting mirror including a large opening for light emission, a small opening used for holding said luminescent tube, and a light reflection surface disposed to encircle said luminescent tube;
- a holding member disposed to block a part of said small opening, said holding member holding said luminescent tube in said reflecting mirror;
- a light transmitting protection plate for blocking said large opening;
- a ventilator for sucking air inside said reflecting mirror through said small opening and sending out the air through an outlet of the ventilator;
- a housing for combining said reflecting mirror and said ventilator so as to form a channel for directing the air sucked through said small opening toward said ventilator;
- said reflecting mirror including an air inlet disposed closer to said large opening than a center position of said luminescent tube;
- a duct for forming a passage which connects said air inlet of said reflecting mirror to an outside of the apparatus;
- a door for opening and closing said passage; and
- a returning member for returning said door to a closed position thereof when said door is free from external forces.

7. The light source apparatus according to claim 6, further comprising a stopping member keeping said door open.

* * * * *